Oct. 31, 1939.   S. H. DIXON ET AL   2,178,300
AMUSEMENT DEVICE
Filed Dec. 3, 1937   4 Sheets-Sheet 1
Fig. 2.
Fig. 1.
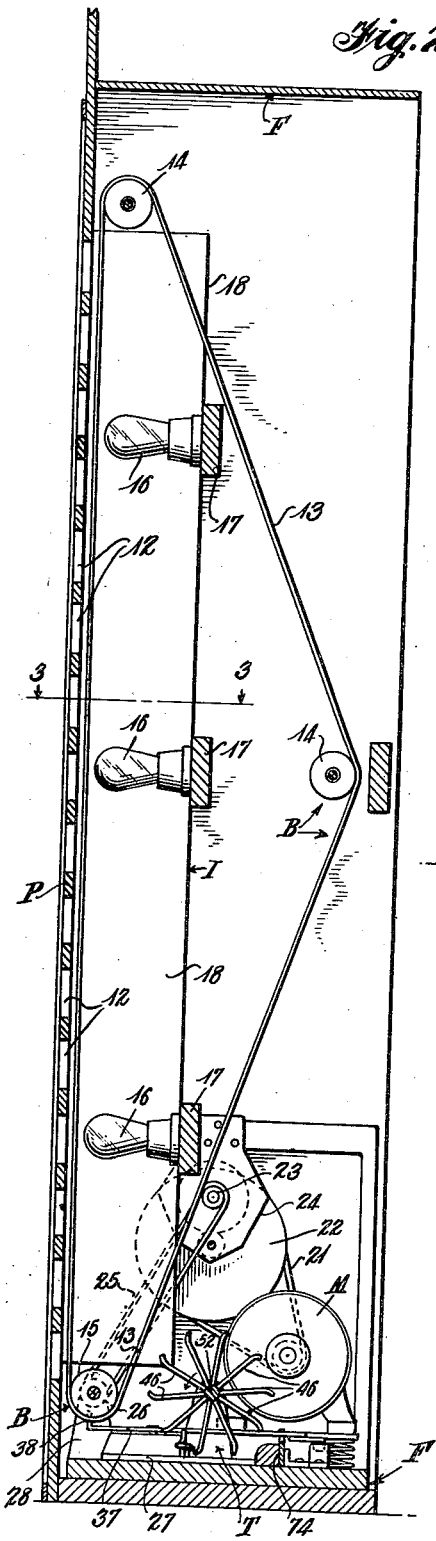
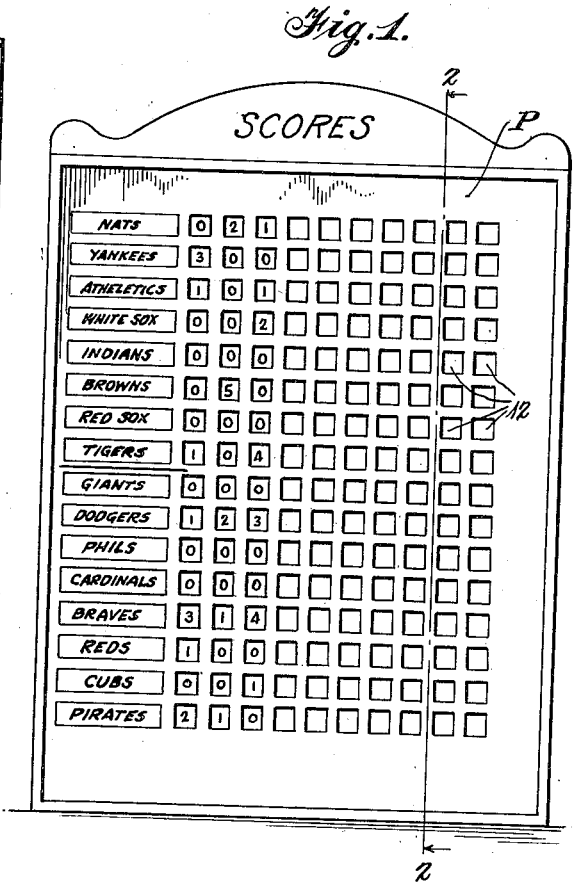
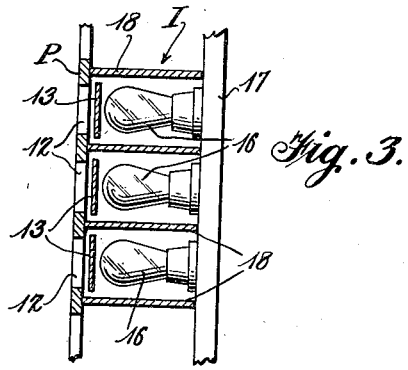
Inventors
South H. Dixon
and Lucian Hurd
By Ralph L. Stevens
Attorney Oct. 31, 1939.  S. H. DIXON ET AL  2,178,300
AMUSEMENT DEVICE
Filed Dec. 3, 1937  4 Sheets-Sheet 2

Inventors
South H. Dixon
and Lucian Hurd

By Ralph L. Stevens
Attorney

Oct. 31, 1939.   S. H. DIXON ET AL   2,178,300
AMUSEMENT DEVICE
Filed Dec. 3, 1937   4 Sheets-Sheet 3
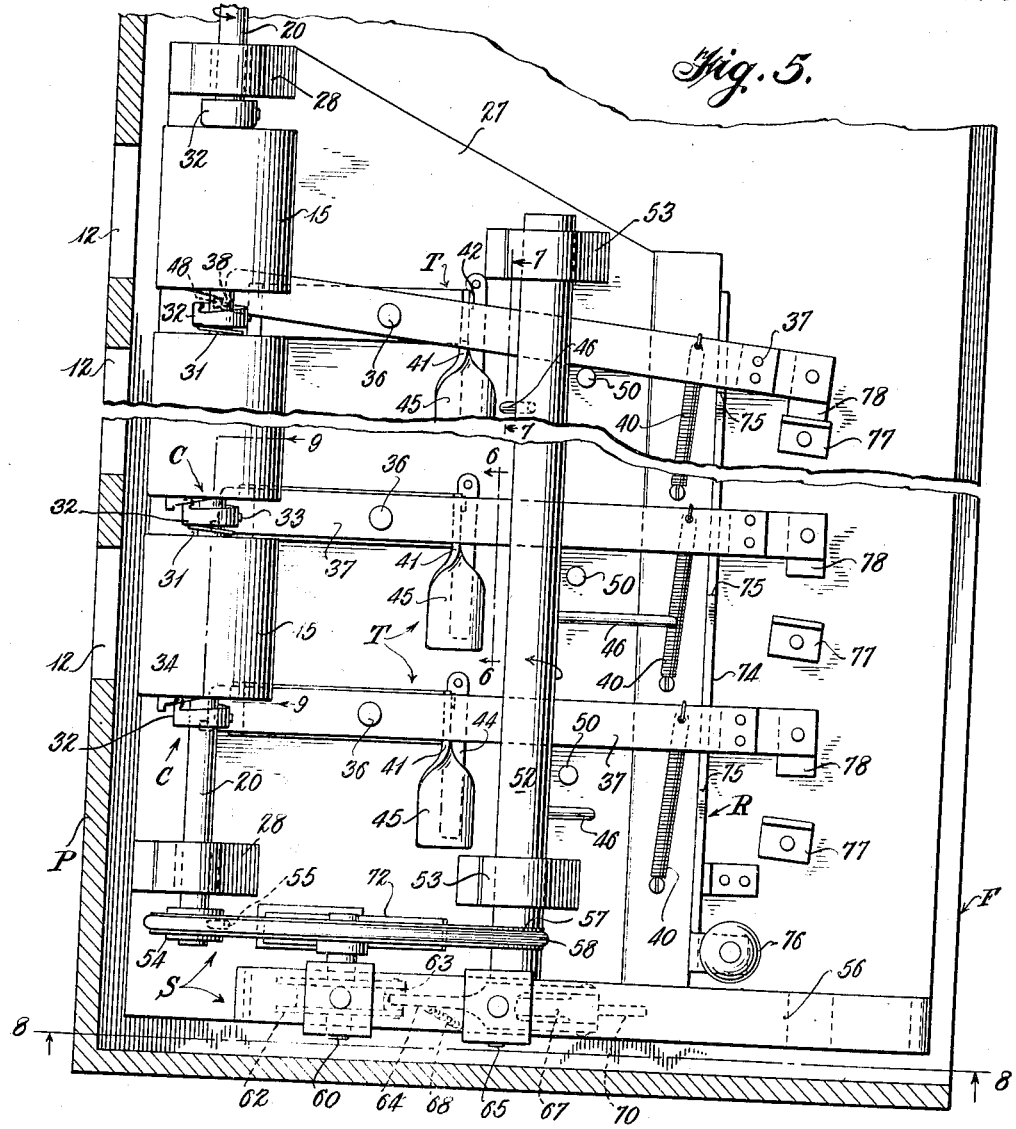
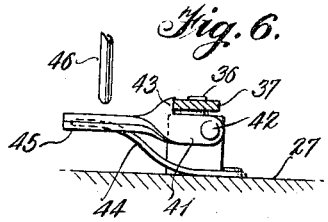
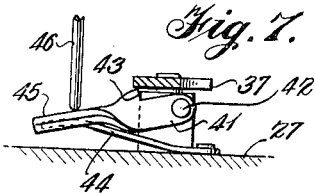
Inventors
South H. Dixon
and Lucian Hurd
By Ralph L. Stevens
Attorney

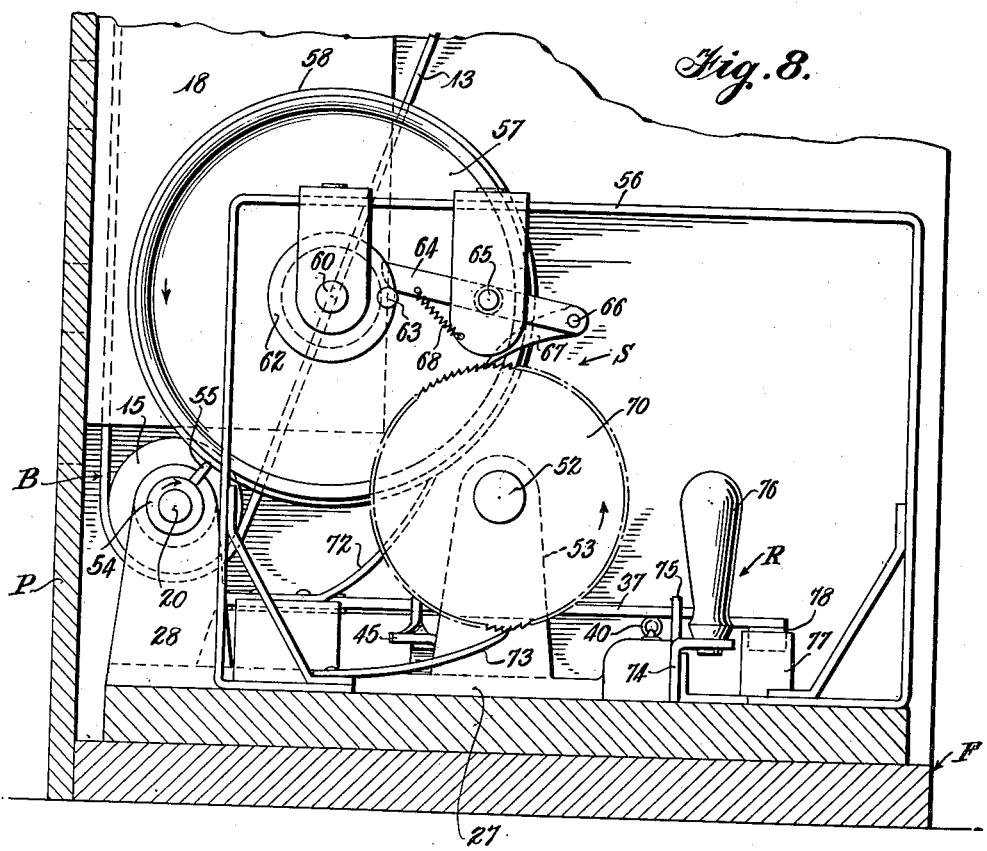
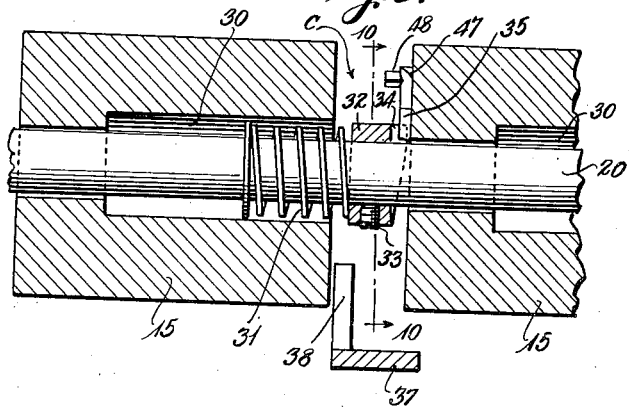
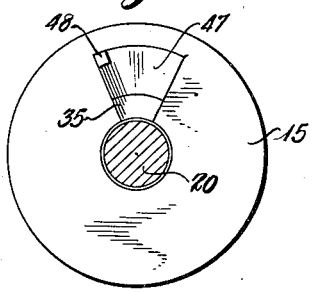
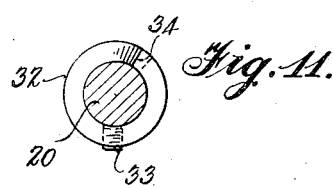

Patented Oct. 31, 1939

2,178,300

UNITED STATES PATENT OFFICE 2,178,300

AMUSEMENT DEVICE

South H. Dixon and Lucian Hurd, Johnson City, Tenn.

Application December 3, 1937, Serial No. 178,008

7 Claims. (Cl. 40—32)

The present invention relates to amusement devices and especially to a registering or totalizing apparatus which operates under the laws of chance.

More particularly, this invention relates to an automatically operable scoring apparatus for producing and indicating the results of imagined athletic contests. For example, the apparatus may be designed and used to register the scores of imaginary baseball and football games, period by period of play. Preferably it is designed to record the results of games theoretically played by a plurality of pairs of teams, or the results of events involving a plurality of contestants.

The primary object of our invention is to provide apparatus of this character in which the progress of a game or other event is denoted automatically after starting the machine into operation, and in which there is a material time interval or lag between registrations of scores by periods of a game or positions of contestants in a race.

It is a major object of the present invention to devise a machine of the above character in which indicia will be accurately and clearly presented to view periodically by chance mechanism, without opportunity for anyone to foretell either the value of the approaching registration or the final result of the contest.

It is an object of our invention to provide a registering machine comprising a panel having rows of windows or apertures associated with traveling belts carrying indicia visible at certain times through said windows, and mechanism for driving said belts and for stopping them individually, in succession. More specifically, it is an object to devise a belt-controlling mechanism embodying a clutch disengageable after an approximately predetermined period of operation and including means for ensuring accurate registration of the belt indicia with the panel windows.

A further object of this invention resides in the provision of a speed reduction mechanism designed particularly for use in apparatus of the character described.

The foregoing and other important objects of our invention will clearly appear from a study of the following detailed description when taken in conjunction with the accompanying drawings and the appended claims.

In the drawings:

Figure 1 represents a face view of a preferred embodiment of our invention.

Figure 2 is a view in vertical section and to much larger scale, of the apparatus of Figure 1, substantially as seen on the plane of line 2—2 in Figure 1.

Figure 3 is a fragmentary sectional view looking downwardly upon the plane of line 3—3 in Figure 2.

Figure 5 is an enlarged fragmentary sectional view substantially as seen when looking down upon the plane of line 5—5 in Figure 4.

Figure 6 is a detail showing of a latch and trigger mechanism, in latched position, as seen from the rear upon plane 6—6 in Figure 5.

Figure 7 is a similar view, in unlatched or released position, as seen upon plane 7—7 in Figure 5.

Figure 8 is an enlarged detail view in side elevation of the major speed reduction mechanism of the machine, as seen when cutting the framework or casing upon line 8—8 in Figure 5.

Figure 9 is an enlarged detail view, in section, of a pair of rolls and associated clutch mechanism, substantially as seen on line 9—9 in Figure 5.

Figure 10 represents a face view of the clutching end of one end of a roll, as seen on line 10—10 in Figure 9.

Figure 11 is a face view of the roll-engaging side of a clutch collar.

Figure 4:
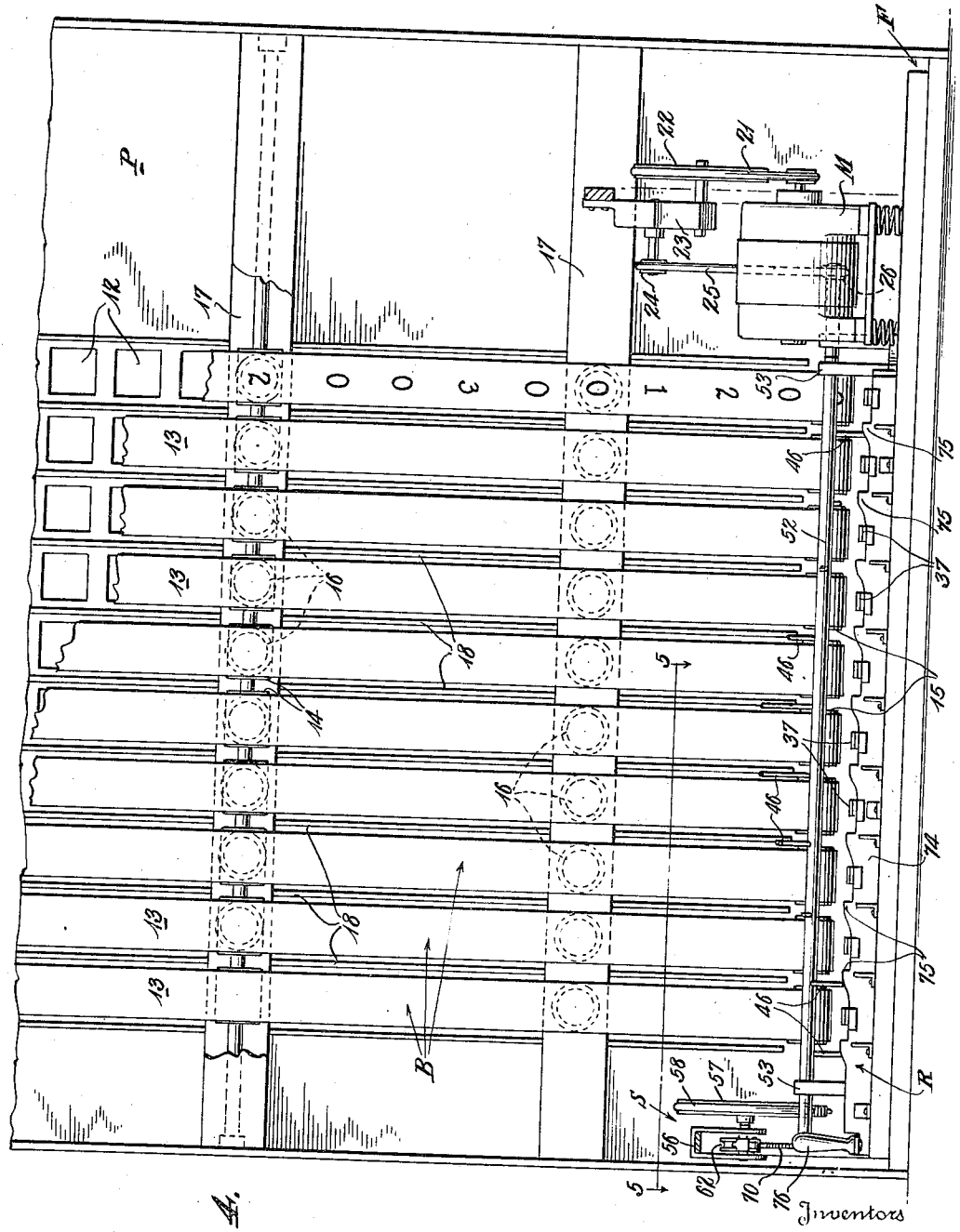
Figure 4 represents a rear elevational view of the machine.

With continued reference to the drawings, wherein like characters are employed to designate like parts, and with particular reference for the moment to Figures 1 to 5, and 8, the illustrated embodiment consists essentially of the following major parts.

A windowed or apertured panel P is supported in upright position by a framework or casing structure F, which also serves as a housing for mounting and concealing the operating mechanism. The said mechanism comprises a series of belt and roller assemblies B the belts of which are rendered visible at times through the panel windows by an illumination arrangement I; a motor M for driving the belts and for operating a speed reduction mechanism S; a series of clutch and centering devices C, one for each belt; a series of trip and release devices T, corresponding in number with the belts and actuated by the reduction mechanism S; and a reset device R for simultaneously re-engaging all the clutches C and relatching all the trip and release devices T after one complete cycle of operation of the machine.

The windows of the panel P consist of a multiplicity of rectangular apertures 12 arranged in horizontal and vertical rows. Opposite each horizontal row may be placed the name of an athletic team or an individual contestant; and the vertical rows represent periods of play, or the successive positions of a contestant in a race. For example, as illustrated in Figure 1, there is room for all of the teams of the two major baseball leagues, to be paired for play through nine periods or innings. The tenth vertical row is for the purpose of breaking any tie scores. A series of games is being played involving all teams of both leagues, and the game has progressed through the third inning. At this time, the belts, which carry indicia in the form of numerals representing scores, as shown, are not all in motion. Those behind the first three vertical rows of apertures have been stopped successively by portions of the trip and release mechanism T, and have become illuminated by portions of the lighting arrangement I; and the remainder are still traveling behind the other vetical rows of apertures, without illumination. After a time interval which is approximately predetermined, the belt behind the fourth row of apertures will become stopped and illuminated, and so on to the conclusion of play.

The observers see only the face of the scoreboard. Each person may select one or more pairs of teams either by chance or by choice before play is started, and the person with the highest aggregate score is the winner. It will be appreciated that the manner of playing the game may be varied in many ways. As there is a considerable interval between score indications for successive innings, fun and excitement can be had by the observers or players in endeavoring to guess or predict the leading teams for the next score registration. The concealed mechanism for automatically and accurately causing the game to progress from start to conclusion is as follows.

The belt and roller assemblies B consist of a series of endless transparent or translucent film strips 13, each arranged in triangular form (see Figure 2) to pass over a pair of idle rolls 14 and a driving roll 15. The indicia, previously mentioned, are placed on the inside of the strip, as in red color, for example, and hence are invisible through the windows 12 unless a circuit is completed through several lamps 16 which are disposed in vertical column behind each vertical row of windows. The lamps and their sockets are mounted on transverse members 17 which form part of the framework, and the vertical columns of lamps are separated by sheet metal dividers 18 which are coated or polished to afford good light reflection. Each group of lights is in an individual branch circuit to be closed individually by means later described, and affords illumination for only one row of indicia.

The indicia spacing on each belt must be uniform and equal to the spacing of the windows in the corresponding vertical row. Also, there must be a definite relationship between the size of each driving roll 15 and the indicia spacing, with no slipping between the roll and the film, in order to ensure accurate registration of the indicia with the exposure windows, in a manner fully explained hereinafter.

The electric motor M has a cushioned mounting at one side of the cabinet or framework. A drive shaft 20, which extends axially through all of the driving rolls 15, is driven from this motor at reduced speed by mechanism comprising a belt 21 which operates a large wheel 22 which in turn operates a small wheel 23 through a gear box 24, and a second belt 25 which encompasses the wheel 23 and a pulley wheel 26 that is secured to said shaft 20. The entire reduction is such that, with a motor running at 1750 R. P. M. the shaft 20 is rotated at a speed of about 22 R. P. M. The motor and shaft operate continuously throughout the game. The gear box 24 is mounted on one of the transverse frame members 17.

A cast bed or block 27 is disposed in the bottom of the cabinet and has a pair of integral uprights 28 providing bearings for the ends of the shaft 20. The non-driven end of the shaft extends beyond its bearing to operate the mechanisms S and R, as later explained in detail.

The ten rolls 15, formed of wood, metal or other suitable material, are spaced along the shaft 20, with freedom for relative rotation by virtue of bearings 30 (Figure 9) and with freedom for slight axial movement. The bearings are shorter than the countersunk bores in which they are placed, and the remainder of each bore is occupied by a compression spring 31 which reacts at one end against a collar 32 that is fixedly secured to the shaft 20, as by a set screw 33. The other end of each spring reacts against a bearing 30 to constantly urge the corresponding roll toward the left (as when standing at the rear of the cabinet and looking down upon the rolls), into engagement with the right hand side of another of the collars. Each of said right hand sides is gradually cut back to form a partial helix terminating in a radial shoulder 34 (see Figures 9 and 11) which constitutes a positive clutch element complemental to a radially extending lug 35 on the near end of the adjacent roll. The lugs 35 are primarily clutch elements but they are of special shape to serve another function as explained later.

Thus, it will be perceived that there are ten rolls, ten springs, eleven collars and ten pairs of clutch elements. The eleventh collar 32, at the extreme right end of the shaft obviously need not have clutch characteristics as it serves only as an abutment for the last spring of the series. When play is first started the trip and clutch release mechanism T does not interfere with expansion of the springs 31, and hence all of the rolls are set into rotation by engagement of the multiple sets of clutch elements at the speed of shaft 20. The mechanism T is designed to successively cut the clutches out of operation from right to left, as follows.

Directly behind each clutch, and pivoted on the block 27 at 36, is a lever 37 the forward arm of which has an upright finger 38 adjacent the clutching end of the corresponding roll and the rear arm of which is connected with a tension spring 40. Springs 40 are anchored to the block 27 and are sufficiently strong to swing the levers about their pivots to bring the fingers 38 into contact with the rolls and compress the springs 31, and thus disengage the clutches. This action of springs 40 is normally prevented, however, by a plurality of latch means, each comprising an arm 41 which is so pivoted at 42 as to interpose a latching shoulder 43 in the path of the lever 37 when said arm 41 is permitted to be swung upwardly to horizontalism by a leaf spring 44. (See Figures 5, 6 and 7.) The pivots 42, and one end of each leaf spring, are secured stationarily on the block 27, as shown, and hence the free ends of the leaf springs constantly react upwardly against the arms 41. Normally the latching parts are in the position illustrated in Figure 6, with the levers 37 urged against the latch shoulders 43 by the tension springs 40. For releasing the latches each arm 41 has an extension 45 which may be positively depressed, in a manner later explained, by a trip element 46. In Figure 7 and at the extreme upper part of Figure 5, a latch is shown in tripped position with the lever 37 shifted to cause clutch disengagement.

In order that the clutches will not be haphazardly and suddenly stopped with the film indicia out of accurate registry with the panel windows 12, the clutching end of each roll 15 is provided with synchronizing means which, as shown, constitutes a radial continuation of the lug 35 but which may be formed separately therefrom. This means, comprising a helical cam surface 47 and a pin 48 interposed in the path of the lever finger 38 (Figures 9 and 10) cooperates with a lever stop 50 (Figure 5) to complete the clutch disengagement exactly at the moment the pin 48 engages the finger 38. The stationary stops 50 prevent the levers from swinging far enough to fully disengage the clutch elements but permit the levers to interpose their fingers 38 in the paths of rotation of the cam surfaces 47. The latter spiral away from their corresponding rolls in a direction reverse to that of roll rotation, and hence, when tripping occurs and the fingers 38 lightly engage the roll ends on their flat portions (which is most frequently the case because the flat area greatly exceeds the cam area), the cam will contact the vertical upper ends of the fingers 38 and ride past them to thrust the rolls in the direction of clutch disengagement. When the high portions of the cams reach the fingers, the clutches are completely released and at this same instant the pins 48 positively engage the fingers 38 to prevent further roll rotation.

Thus, if each roll is of perfectly uniform diameter, and its diameter and the location of its pin 48 are properly correlated with the indicia size and spacing on the belt which is driven by the roll and with the panel windows, the roll will always stop in position to cause accurate registration of a column of indicia with its corresponding vertical row of panel windows.

Successive tripping of the various levers 37 is automatically accomplished by a very slowly rotating shaft 52 which is disposed on a level with but behind the primary shaft 20 and which carries the trip elements 46. There are ten of these elements, one individual to each latch arm extension 45, and they are arranged with their points of anchorage equally spaced and spiralling gradually about the shaft 52 axially thereof. The ends of this shaft are journaled in uprights 53 on the base block 27. The elements 46 are elongated and each preferably is curved at its free end as shown, for smoothly engaging and depressing its complemental latch arm extension 45, the latter in turn preferably being twisted slightly about its axis, as shown, to produce a camming curvature.

The shaft is so positioned that when the machine is started all elements 46 will be out of contact with the latch mechanisms and the element 46 at the extreme left end of the cabinet (viewed from the front) will be the first to engage its coacting latch extension 45 as the shaft is slowly rotated (in counterclockwise direction, Figure 2).

It follows that continued rotation will successively trip all of the latches, in serial order, with the time interval between trips governed by the speed of rotation (which necessarily must be very much slower than that of the primary shaft 20).

In order to operate shaft 52 from shaft 20 and to obtain power from the same motor M for the shaft 52, the latter is coupled to shaft 20 by the simple but very effective reduction mechanism S, which comprises the following parts. (Figures 5 and 8.)

At its non-driven end the shaft 20 carries a small collar 54 in which is fitted a single radial pin 55. A metal framework 56, secured to the base block 27, carries a large idle wheel 57 having a soft rubber tire 58 in position to be engaged by the tip of pin 55 once during each rotation of the collar 54. It therefore requires a great many revolutions (approximately 44 in the illustrated arrangement) of the pin to produce a single rotation of the wheel 57. The latter is secured centrally to a short shaft section 60 which also carries and drives a pair of discs 62. These discs are designed to carry a horizontal pin 63 between them at a locus adjacent the axis of rotation so that once, during each disc rotation, the pin 63 engages and lifts one end of a small lever 64 which is pivoted at 65 on a portion of the stationary framework 56. The other end of the lever pivotally carries, at 66, a pawl 67. A light tension spring 68 serves to return the lever to approximately horizontal position after each passing of the pin 63.

A relatively large ratchet wheel 70 is secured to the shaft 52 in position to be peripherally engaged by the pawl 67, as best seen in Figure 8, from which it is clear that each oscillation of the lever 64 will cause the pawl to move the ratchet wheel counterclockwise through a distance equalling the sum of several teeth. The shaft 52 therefore rotates only once during several hundred rotations of shaft 20. With the illustrated arrangement the shaft 52 completes one rotation (a full game) in approximately 2 to 2½ hours, corresponding in time with that usually required to play nine or ten innings of a baseball game. The timing of course can be varied when building the machines to play other games, or to rather rapidly register the progress of other events, such as horse, automobile or boat races.

The drive between pin 55 and rubber tire 58 is as accurate as a tooth and gear drive, due to slight compression of the tire during each engagement, and it is noiseless and of permanent life. A curved band spring 72 rides against the tire to further ensure accuracy, and a similar spring 73 rides over the bottom of wheel 70 for the same reason.

After some or all of the mechanisms T have been actuated, they can readily be returned simultaneously to latched position, for clutch engagement, by the reset device R (see Figures 4, 5 and 8) which comprises an elongated transversely arranged bar 74 which is arranged for manual reciprocation below the levers 37 and provided with ten shouldered cams 75 on its upper edge. The cams slide under the levers in one direction of bar reciprocation to a position where they do not interfere with tripping, and in the other (reset) direction their shoulders engage the levers 37 to force the latter to swing until the latches 41 can rise (as in Figure 6) to hold them in positions permitting clutch engagement for all the rolls. A readily accessible handle 76 is secured to one end of the bar for the purpose of reciprocating it manually.

Automatic illumination, inning by inning, is obtained through the lamps already described, a simple circuit (not shown) and ten switches comprising elements 77 and 78. The elements 77 are carried on the rear ends of the levers 37 and the elements 78 are stationarily mounted on the machine base or the framework. All of the elements will of course be properly insulated relative to their supports, and the various switches will be connected in individual branch circuits with their corresponding vertical rows of lamps. Therefore, when the first film stops to record the scores for the first inning it will immediately be illuminated through closure of a corresponding switch. At this time all other switches are open and their corresponding films are substantially invisible, with indicia fully concealed. Once its switch has been closed each group of lamps remains lighted until play is concluded and until the reset device R is actuated to swing all the levers 37 and open all the switches.

The elements 77 preferably are formed of carbon or equipped with carbon contacts, and the elements 78 preferably have copper contacts which yield slightly when engaged by the carbon elements, thus to ensure good non-sparking connections when the switches are closed and absence of interference of the switches with the other mechanism actuated by the levers 37.

To put the machine into operation it is necessary only to start the motor M and to shove inward and withdraw the reset handle 76. Thereafter, the scoring is carried out, automatically and by chance, period by period in proper sequence until full game time has elapsed. It is thought unnecessary to repeat or summarize the detailed operation. In the illustrated embodiment, there is only about a remote chance (about 1 in 3500) of a tie game, and therefore it is hardly necessary to add the tenth film and its associated mechanisms.

The team names and pairings may be placed on a film, like the scores, and associated with windows to register the pairings by chance in the same manner that the scores are registered. Obviously, many other changes in structure and in mode of play may be made within the scope of our invention. Therefore, we desire that any patent issued to us be interpreted in the light of our general disclosure and the granted claims rather than by the specific details of the illustrated and described embodiment.

What is claimed is:

1. In apparatus of the character described, a drive shaft, a score registering element, means between said shaft and said element to drive the latter from the former, said means including a disengageable clutch comprising a pair of elements with a spring tending to separate them, and trip means connected between said shaft and said clutch to cause disengagement thereof, said trip means comprising a latch, spring-pressed means retainable by said latch and operable when released to overcome said spring and open the clutch, and a device operable by said shaft to trip the latch.

2. In apparatus of the character described, in subcombination, a shaft having a roll rotatably mounted thereon; a pair of collars secured to the shaft at opposite ends of the roll and with sufficient spacing to permit a limited axial movement of the roll; complemental clutch elements on one end of the roll and the adjacent collar, and spring means tending to shift the roll axially to produce clutch engagement; and mechanism for disengaging the clutch elements and stopping said roll in predetermined position, said means comprising a cam on the roll, a device shiftable into position for engagement by said cam to move said roll longitudinally against the resistance of said spring means in response to roll rotation, said cam being of sufficient size to completely disengage the clutch elements, and a stop element associated with the cam in such manner as to engage said shiftable device and hold said roll against further rotation upon completion of clutch disengagement.

3. Machine apparatus of the class described comprising a wall provided with rows of apertures, means affording a plurality of indicia movable into registry with and past said apertures, drive mechanism for said means, comprising a plurality of normally engaged clutches, means for successively and serially disengaging said clutches, and mechanism common to said disengaging means and all of said clutches to reset the apparatus to starting position with all clutches engaged.

4. In combination, an electric motor; a shaft; speed reduction mechanism interposed between said motor and said shaft; a plurality of clutches along said shaft and a corresponding plurality of registering devices associated individually with said clutches to be driven thereby; and clutch disengaging means comprising speed reducing means operable by said shaft, and mechanism actuated by said reducing means to selectively disengage said clutches, said mechanism comprising trip latches individual to the clutches and means for progressively releasing said latches.

5. In the combination defined in claim 4, said mechanism including pivoted levers extending into proximity to said clutches and engaged by said trip latches, and spring means operable to swing said levers to disengage said clutches upon release of said latches.

6. In combination, registering means, a primary shaft and associated mechanism for driving said registering means, and means including a second shaft for stopping said registering means after an approximately predetermined extent of rotation of said primary shaft, said stopping means being connected to said primary shaft and including speed reduction mechanism comprising a radial pin revolved by said primary shaft, an idle wheel engaged momentarily by said pin once in each revolution, a ratchet wheel on said second shaft and an associated pawl mechanism, and means for actuating said pawl mechanism once during each revolution of said idle wheel.

7. A mechanism of the character described comprising, in subcombination, a pair of parallel shafts, a revolving radial pin on one shaft and a ratchet wheel on the other, an idle wheel having a rubber tire in position for engagement by said radial pin once in each revolution, and a pawl mechanism driven by said idle wheel to actuate said ratchet wheel periodically.

SOUTH H. DIXON.
LUCIAN HURD.